Patented Sept. 25, 1928.

1,685,733

UNITED STATES PATENT OFFICE.

GEORG FRIEDRICH UHDE, OF BOVINGHAUSEN, GERMANY.

METHOD FOR PURIFYING GASES.

No Drawing. Original application filed February 6, 1926, Serial No. 86,635, and in Germany February 9, 1925. Divided and this application filed April 15, 1926. Serial No. 102,305.

This invention relates to a method for purifying gases. The object thereof is to remove foreign matter from gases even the smallest residue of them which act in certain processes, for instance in hydrating processes and in similar methods as poisonous matter, if present in the smallest possible quantities. Such foreign matter or poisons are for instance carbon monoxide, carbonic acid, oxygen, sulfur compounds, water and the like.

The present method consists in bringing into intimate contact the gases to be purified with alkali metals or with alkaline earth metals or the amides thereof in a finely divided state, so that the gases are thereby substantially completely freed from the residue of foreign matter acting as poison. The intimate contact may be obtained by passing the gases through the purifying agent or by washing the gases with the purifying agent. Instead of the alkali metals or the alkaline earth metals or the amido-compounds thereof, mixtures of the metals or of the amides amongst each other or of both groups may likewise be employed. It is preferable to employ the cleansing means in dissolved state, by dissolving them in a water free solvent. For instance the metals may be dissolved in their amido-compounds or a mixture of the above cited kind respectively. By this treatment the gases are purified to a degree previously unattainable. Gases which to-day are considered as practically pure may be rendered considerably purer, so that by the common analytic method no residue or no presence of foreign matter or disturbing substance may be found by test.

As stated, the alkali forming metals, that is the alkali and alkaline earth metals can be used alone or they can be dissolved in water free solvents such as the amides of the alkali forming metals.

This application is a division of my co-pending application Serial Number 86,635 filed February 6, 1926.

I claim:

1. The process of purifying gases which comprises intimately contacting the gas to be purified with alkali forming metals dissolved in amides of alkali forming metals.

2. The process of purifying gases which comprises intimately contacting the gas to be purified with alkali metals dissolved in amides of alkali forming metals.

3. The process of purifying gases which comprises intimately contacting the gas to be purified with alkali metals dissolved in alkali metal amides.

In testimony whereof I affix my signature.

GEORG FRIEDRICH UHDE.